United States Patent Office 2,889,318
Patented June 2, 1959

2,889,318

STEROL AMINOALKYL CARBONATES

Clarence G. Bergstrom, Chicago, Ill., assignor to G. D. Searle & Co., Chicago, Ill., a corporation of Delaware No Drawing. Application February 18, 1957
Serial No. 640,990

12 Claims. (Cl. 260—239.5)

The present invention is concerned with sterol derivatives, and more particularly with sterol derivatives having the chemical structure of basic esters of carbonic acid. This invention is concerned not only with such basic esters, but also with non-toxic salts thereof, and with methods for the production of such compounds. The compounds of this invention are carbonates which, in the forms of their free bases, can be represented by the general structural formula

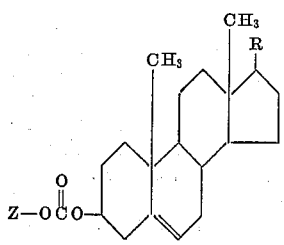

In this formula R is a saturated or unsaturated aliphatic hydrocarbon radical containing eight, nine, or ten carbon atoms, and Z is a nitrogen-containing group of a type to be described more fully hereinafter.

In the manufacture of the compounds of this invention, cholesterol, or a structurally related sterol such as stigmasterol or a sitosterol, is converted to the chloroformate by reaction with an excess of phosgene in ether solution. The chloroformate is then brought into reaction, suitably in acetone solution, with an aminoalkanol, with the production of a carbonate ester which can be isolated as a hydrochloride or as a free base. Aminoalkanols employed in this reaction can be of the type (Lower alkyl)$_2$N—A—OH wherein the lower alkyl radicals are selected from among such lower alkyl radicals as methyl, ethyl, propyl, butyl, amyl, hexyl, heptyl, octyl, and branched-chain isomers thereof, and A is selected from among lower alkylene radicals which separate the groups attached thereto by at least two carbon atoms. Representative of such lower alkylene radicals are polymethylene radicals such as ethylene, trimethylene, tetramethylene, pentamethylene, and hexamethylene, as well as isomeric propylene, butylene, amylene and hexylene radicals attached at different carbon atoms to the adjacent nitrogen and oxygen atoms. The aminoalkanols can also be selected from among compounds of the type

Y—A'—OH wherein Y is a monocyclic, heterocyclic radical containing a single nitrogen atom, such as morpholino, piperidino, pyrrolidino, lower alkyl substitution products thereof and unsaturated and aromatic analogs thereof, and A' is a lower alkylene radical. Subject to the limitation that at least two carbon atoms must separate the nitrogen atom in the group Y and the oxygen atom in the hydroxyl group, A' can be selected from among the methylene radical and the lower alkylene radicals representable by the term A, as described hereinabove. Depending upon the aminoalkanol selected for reactance, the term Z in the general structural formula for the novel compounds of this invention can therefore represent the group (Lower alkyl)$_2$N—A— or the group

Y—A'—

Except in those instances in which the reaction product is essentially an aromatic amine, and therefore possessed of only weakly basic properties, it is advantageous to isolate and purify the reaction product as the hydrochloride. In typical cases described hereinafter, when an acetone solution of the steryl chloroformate is treated with approximately the equivalent amount of an aminoalkanol, the hydrochloride of the desired carbonate separates as an insoluble reaction product and can be recovered directly by filtration. The free base is obtained by rendering an aqueous solution of the hydrochloride basic, extracting with chloroform, and evaporating the chloroform solution to dryness.

The organic bases of this invention form non-toxic, acid-addition and quaternary ammonium salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. Quaternary ammonium salts can be formed by reaction of the free bases with a variety of organic esters of sulfuric, hydrohalic and aromatic sulfonic acids. The organic esters employed for quaternary ammonium salt formation are desirably lower alkyl halides and alkylene halohydrins. However, other organic esters are suitable for salt formation, and can be selected from among a diverse class of compounds including benzyl chloride, phenethyl chloride, naphthylmethyl chloride, dimethyl sulfate, methyl benzenesulfonate, ethyl toluenesulfonate, allyl chloride, methallyl bromide and crotyl bromide. For purposes of this invention the free bases are equivalent to their non-toxic acid-addition and quaternary ammonium salts.

The compounds of this invention have valuable pharmacological properties, and are particularly useful as depressants of the central nervous system. For example, their administration produces a state of tranquility which is desirable in the treatment of conditions characterized by mental agitation. They also potentiate the action of barbiturates in maintaining a state of hypnosis.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.) and quantities of materials in parts by weight.

EXAMPLE 1

Over a period of 45 minutes, an excess of phosgene is introduced into a stirred solution of 260 parts of cholesterol in 1850 parts of anhydrous ether. After the solution has been allowed to stand at room temperature for an additional 18 hours, a stream of nitrogen is conducted through the solution for two hours. The solution is then distilled to dryness under reduced pressure and the solid residue is recrystallized from acetone. The compound thus obtained is 5-cholesten-3β-yl chloroformate which melts at about 122–123.5° C. The structural formula is

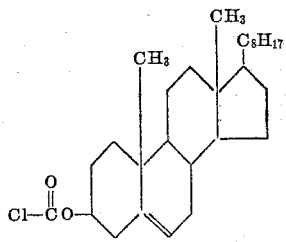

Note on Examples 2–9

The carbonates of the following examples, formulated as free bases, have the general structural formula

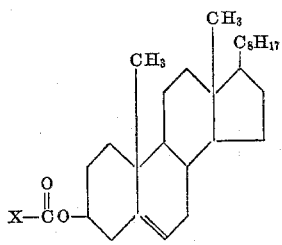

wherein the radical represented by X is as follows:

| Example No. | X |
|---|---|
| 2 | $(CH_3)_2NCH_2CH_2-$ |
| 3 | $(C_2H_5)_2NCH_2CH_2-$ |
| 4 | $(C_2H_5)_2NCH_2CH_2CH_2-$ |
| 5 | $(C_4H_9)_2NCH_2CH_2-$ |
| 6 | $(C_4H_9)_2NCH_2CH_2CH_2-$ |
| 7 | $O\begin{matrix}CH_2-CH_2\\ \phantom{x}\\ CH_2-CH_2\end{matrix}N-CH_2-CH_2-$ |
| 8 | $\begin{matrix}CH_2-CH(CH_3)\\ CH_2\phantom{xxxx}\\ CH_2-CH(CH_3)\end{matrix}N-CH_2CH_2-$ |
| 9 | 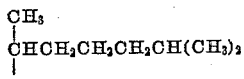 |

The radical $C_8H_{17}$ when used without further qualification in the specification and claims of this invention represents the C–17 substituent of cholesterol, $$\overset{CH_3}{\underset{|}{C}}HCH_2CH_2CH_2CH(CH_3)_2$$

EXAMPLE 2

A refluxing solution of 20 parts of 5-cholesten-3β-yl chloroformate in 160 parts of acetone is treated with a total of 4.0 parts of 2-dimethylaminoethanol, added gradually over a period of several minutes. A dense, white precipitate forms. The mixture is refrigerated for complete separation of product, and the product is collected on a filter. By recrystallization from a mixture of chloroform and petroleum ether or from a mixture of acetone and chloroform there are obtained crystals of the hydrochloride of 5-cholesten-3β-yl dimethylaminoethyl carbonate melting at about 206–208° C.

Ten parts of the hydrochloride of 5-cholesten-3β-yl dimethylaminoethyl carbonate is converted to the free base by dissolving it in 750 parts of chloroform and stirring the solution with 250 parts of a saturated aqueous solution of sodium bicarbonate. The chloroform solution, which contains the organic free base, is washed with two portions of water and rendered anhydrous. Methyl iodide (55 parts) is added to the chloroform solution, which is then allowed to stand for 4 days, at which time separation of a white, crystalline product appears complete. This product is collected on a filter. An additional quantity of the same material can be obtained by concentration of the filtrate. By recrystallization of the crude product from chloroform there are obtained small white needles of the methiodide of 5-cholesten-3β-yl dimethylaminoethyl carbonate melting at about 204–208° C.

A chloroform solution of the free base, 5-cholesten-3β-yl dimethylaminoethyl carbonate, prepared from 10 parts of the hydrochloride as in the procedure of the preceding paragraph, is evaporated to dryness. A solution of the residue in ether is treated with a slight excess of hydrogen bromide in isopropyl alcohol. The insoluble product which separates in the hydrobromide of 5-cholesten-3β-yl dimethylaminoethyl carbonate.

EXAMPLE 3

To a refluxing solution of 10 parts of 5-cholesten-3β-yl chloroformate in 80 parts of acetone is slowly added 2.6 parts of 2-diethylaminoethanol. An insoluble product soon separates as a gel or semi-crystalline substance. The mixture is allowed to stand at room temperature for three hours and is then refrigerated for complete separation of product. The product, which amounts to about 11.6 parts, is collected on a filter. For purification it is dissolved in about 60 parts of hot chloroform, and the solution is filtered and poured into about 80 parts of acetone at room temperature. The purified product separates as fine needles. This compound is the hydrochloride of 5-cholesten-3β-yl diethylaminoethyl carbonate. It melts at about 179–183° C.

Four parts of the hydrochloride of 5-cholesten-3β-yl diethylaminoethyl carbonate is converted to the free base by partitioning between 150 parts of chloroform and 250 parts of a saturated, aqueous sodium bicarbonate solution. The chloroform solution, which contains the organic free base, is rendered anhydrous, filtered, and treated with 55 parts of methyl iodide. The solution is maintained in the dark at about 25° C. for about 20 days. It is then poured into several times its volume of petroleum ether, and the insoluble product is collected. This crude product, which amounts to about 4 parts, is dissolved in 15 parts of warm chloroform. The chloroform solution is filtered, and the filtrate is poured into 80 parts of acetone. The reprecipitated product is collected on a filter. It is the methiodide of 5-cholesten-3β-yl diethylaminoethyl carbonate which melts at about 193–195° C.

EXAMPLE 4

3-diethylaminopropanol (2.92 parts) is added to a refluxing solution of 10 parts of 5-cholesten-3β-yl chloroformate in 80 parts of acetone. A gelatinous precipitate begins to form almost at once. The mixture is cooled and maintained at room temperature for 3 hours, following which it is refrigerated for complete separation of product. This crude product is collected on a filter and, when dried, is found to amount to about 12 parts. For purification it is dissolved in about 60 parts of warm chloroform, and the chloroform solution is filtered and poured into 80 parts of acetone. The crystalline product which results is collected on a filter. It is the hydrochloride of 5-cholesten-3β-yl 3-diethylaminopropyl carbonate. This compound melts at about 186–189° C.

EXAMPLE 5

A solution of 10 parts of 5-cholesten-3β-yl chloroformate in 80 parts of hot acetone is treated with 3.86 parts of 2-dibutylaminoethanol. The mixture is cooled, allowed to stand at room temperature for 3 hours, and then refrigerated for complete separation of the insoluble product. The white, granular solid product is collected on a filter and purified by recrystallization from a mixture of chloroform and acetone. The compound thus obtained is the hydrochloride of 5-cholesten-3β-yl dibutylaminoethyl carbonate which melts with decomposition at about 184–187° C.

EXAMPLE 6

To a hot solution of 10 parts of 5-cholesten-3β-yl chloroformate in 80 parts of acetone is added 4.16 parts of 3-dibutylaminopropanol. The mixture is maintained at room temperature for about 3 hours and then under refrigeration for about 16 hours. The solid product obtained by filtration is purified by recrystallization from a mixture of chloroform and acetone. The compound obtained in this manner is the hydrochloride of 5-cholesten-3β-yl 3-dibutylaminopropyl carbonate melting with decomposition at about 183–188° C.

EXAMPLE 7

A hot solution of 10 parts of 5-cholesten-3β-yl chloroformate in 80 parts of acetone is treated with 2.92 parts of 2-morpholinoethanol. A gel begins to form almost immediately. The mixture is maintained at room temperature for about 1 hour and is then refrigerated. The gel is triturated with 80 parts of acetone, and the insoluble product is collected on a filter. It is crystallized from a mixture of chloroform and acetone or from a mixture of chloroform and acetonitrile to afford the hydrochloride of 5-cholesten-3β-yl morpholinoethyl carbonate melting at about 210–224° C.

EXAMPLE 8

By the procedure of Example 7, with the substitution of 3.5 parts of 2-(2,6-dimethylpiperidino)ethanol for the 2-morpholinoethanol, the compound obtained is the hydrochloride of 5-cholesten-3β-yl 2,6-dimethylpiperidinoethyl carbonate.

EXAMPLE 9

A refluxing solution of 10 parts of 5-cholesten-3β-yl chloroformate in 80 parts of acetone is treated with 2.43 parts of 2-pyridinemethanol. A crystalline product begins to separate almost immediately. The mixture is cooled to room temperature and, after about 15 minutes, is refrigerated for complete separation of product. This product, which amounts to about 8.6 parts, is collected on a filter and dried. For purification, it is first extracted with 150 parts of boiling chloroform, and insoluble matter is removed by filtration. The filtrate is concentrated to a small volume, diluted with several times its volume of acetone, and again concentrated to a small volume for recovery of product. The semi-crystalline or gelatinous mass which separates is further purified by crystallizations from mixtures of chloroform and acetone to afford the free base, 5-cholesten-3β-yl 2-pyridinemethyl carbonate melting over a range from about 125–152° C. This compound has a specific rotation of about —23° in chloroform solution.

EXAMPLE 10

A filtered solution of 250 parts of β-sitosterol in 2100 parts of anhydrous ether is treated with an excess of phosgene, introduced in a lively stream over a period of 45 minutes. Stirring is continued for an additional hour. During these operations a precipitate forms and then redissolves. A stream of nitrogen is conducted through the solution for 2 hours, following which the ether is replaced by acetone by such means as gradually adding acetone to the mixture while a distillate is continuously removed. This operation is continued until the solution has been concentrated to about one-third of its original volume and the boiling point of the distillate is about 54° C. A solid crystalline mass is obtained when the solution is chilled. The mass is broken up by stirring it with a small amount of additional acetone, and the resulting slurry is filtered. The solid product is thoroughly dried. It is crude 24-ethyl-5-cholesten-3β-yl chloroformate melting at about 80–90° C. This product is suitable for reaction with aminoalkanols without further purification. It has the structural formula

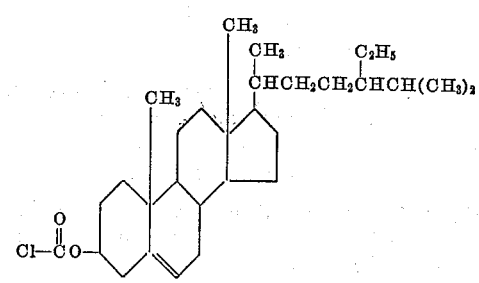

EXAMPLE 11

To a solution of 20 parts of 24-ethyl-5-cholesten-3β-yl chloroformate in 160 parts of warm acetone is added 4.5 parts of 2-dimethylaminoethanol. A solid product begins to separate almost immediately. The mixture is allowed to stand at room temperature for 2 hours and is then filtered. By crystallizations of the crude product from mixtures of chloroform and acetone there is obtained the hydrochloride of 24-ethyl-5-cholesten-3β-yl dimethyl-aminoethyl carbonate melting and decomposition at about 217–220° C. This compound has the structural formula

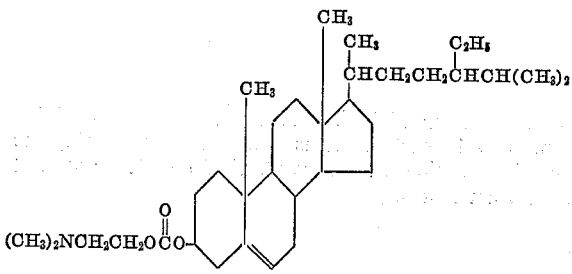

EXAMPLE 12

A solution of 20 parts of 24-ethyl-5,22-chloestadien-3β-yl chloroformate (prepared by treating a solution of stigmasterol in anhydrous ether with a large excess of phosgene, followed by removing the unreacted phosgene with a stream of nitrogen, evaporating the solution to dryness, and crystallizing the residue from acetone) in 160 parts of refluxing acetone is treated with 4.5 parts of 2-dimethylaminoethanol. The reaction mixture is allowed to stand at room temperature for two hours and is then refrigerated for complete separation of product. This product is collected on a filter and washed with a small quantity of acetone. It is the hydrochloride of 24-ethyl-5,22-chloestadien-3β-yl dimethylaminoethyl carbonate and has the structural formula

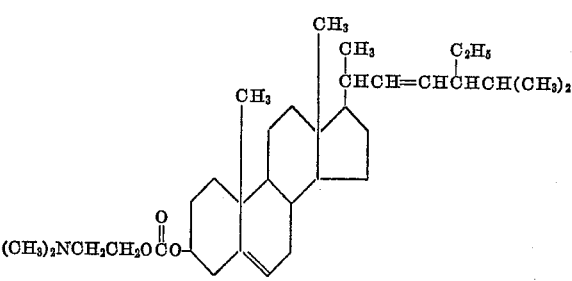

What is claimed is:
1. A member of the class consisting of bases and non- toxic salts thereof, said bases being carbonates of the structural formula

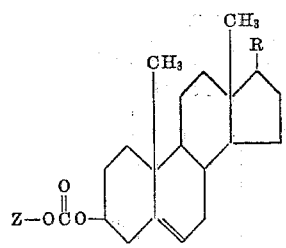

wherein R is an aliphatic hydrocarbon radical containing from 8 to 10 carbon atoms and Z is a member of the class consisting of groups having the formula (Lower alkyl)$_2$N—A— wherein A is a lower alkylene radical separating the groups attached thereto by at least two carbon atoms, and groups of the formula

Y—A'— wherein Y is selected from the group consisting of pyridine, morpholine, and dimethylpiperidine radicals in which the nitrogen atom is separated from the carbonate group hereinabove set forth by at least two carbon atoms and A' is a lower alkylene radical.

2. A compound of the structural formula

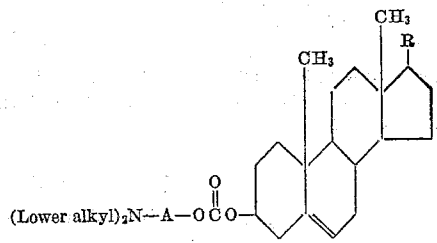

wherein R is an aliphatic hydrocarbon radical containing from 8 to 10 carbon atoms and A is a lower alkylene radical separating the groups attached thereto by at least two carbon atoms.

3. A compound of the structural formula

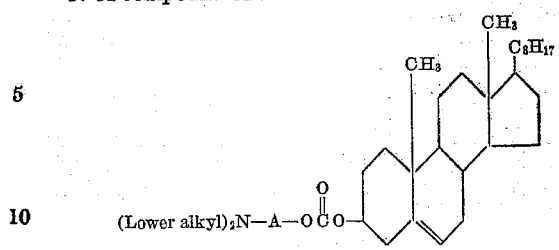

wherein A is a lower alkylene radical separating the groups attached thereto by at least two carbon atoms.

4. 5-cholesten-3β-yl di-(lower alkyl)aminoethyl carbonate.
5. 5-cholesten-3β-yl dimethylaminoethyl carbonate.
6. 5-cholesten-3β-yl diethylaminoethyl carbonate.
7. 5-cholesten-3β-yl 3-di-(lower alkyl)aminopropyl carbonate.
8. 5-cholesten-3β-yl 3-diethylaminopropyl carbonate.
9. A compound of the structural formula

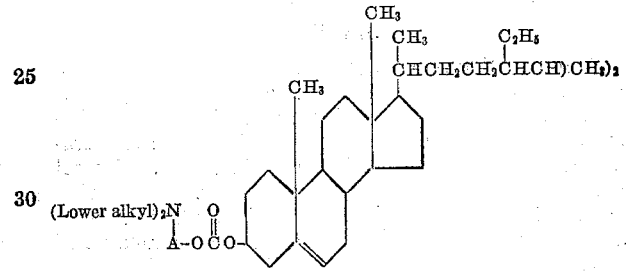

wherein A is a lower alkylene radical separating the groups attached thereto by at least two carbon atoms.

10. 24-ethyl-5-cholesten-3β-yl di-(lower alkyl)aminoethyl carbonate.
11. 24-ethyl-5-cholesten-3β-yl dimethylaminoethyl carbonate.
12. 5-cholesten-3β-yl morpholinoethyl carbonate.

No references cited.

UNITED STATES PATENT OFFICE
CERTIFICATE OF CORRECTION

Patent No. 2,889,318            June 2, 1959

Clarence G. Bergstrom

It is hereby certified that error appears in the printed specification of the above numbered patent requiring correction and that the said Letters Patent should read as corrected below.

Column 3, lines 17 to 28, the formula should appear as shown below instead of as in the patent:

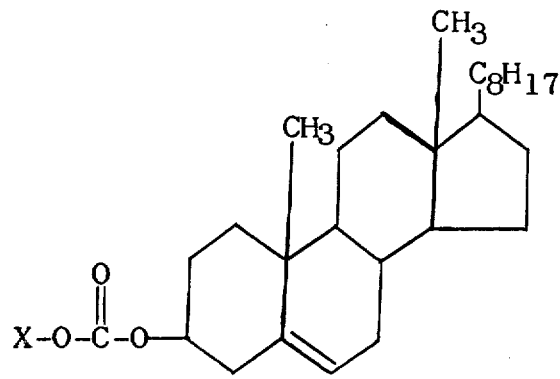

Signed and sealed this 18th day of April 1961.

(SEAL)
Attest:

ERNEST W. SWIDER            DAVID L. LADD
Attesting Officer            Commissioner of Patents